(12) United States Patent
Neuvirth et al.

(10) Patent No.: US 11,991,201 B2
(45) Date of Patent: May 21, 2024

(54) LIKELIHOOD ASSESSMENT FOR SECURITY INCIDENT ALERTS

(71) Applicant: Microsoft Technology Licensing, LLC, Redmond, WA (US)

(72) Inventors: Hani Hana Neuvirth, Tel-Aviv (IL); Ishai Wertheimer, Givat Shmuel (IL); Ely Abramovitch, Tel-Aviv (IL); Yaron David Fruchtmann, Herzliya (IL); Amir Keren, Givatayim (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 17/352,008

(22) Filed: Jun. 18, 2021

(65) Prior Publication Data

US 2022/0407882 A1    Dec. 22, 2022

(51) Int. Cl.
  *H04L 41/0604* (2022.01)
  *G06F 18/214* (2023.01)
  *H04L 9/40* (2022.01)

(52) U.S. Cl.
  CPC ........ *H04L 63/1433* (2013.01); *G06F 18/214* (2023.01); *H04L 41/0627* (2013.01); *H04L 63/1416* (2013.01); *H04L 63/20* (2013.01)

(58) Field of Classification Search
  CPC ............. H04L 63/1433; H04L 41/0627; H04L 63/1416; G06F 18/214
  USPC .......................................................... 726/25
  See application file for complete search history.

(56) References Cited

U.S. PATENT DOCUMENTS

| | | | | |
|---|---|---|---|---|
| 8,898,090 | B2* | 11/2014 | Kapoor | G06F 16/906 |
| | | | | 706/20 |
| 9,699,049 | B2* | 7/2017 | Gupta | H04L 41/149 |
| 2017/0093902 | A1* | 3/2017 | Roundy | G06F 21/554 |
| 2021/0103580 | A1* | 4/2021 | Schierz | G06F 16/2365 |

(Continued)

FOREIGN PATENT DOCUMENTS

| | | |
|---|---|---|
| EP | 2009604 A1 | 12/2008 |
| WO | 2021050145 A1 | 3/2021 |

OTHER PUBLICATIONS

"International Search Report and Written Opinion Issued in PCT Patent Application No. PCT/US22/029934", dated Sep. 15, 2022, 10 Pages. (MS# 409930-WO-PCT).

(Continued)

*Primary Examiner* — Badri Narayanan Champakesan
(74) *Attorney, Agent, or Firm* — Workman Nydegger

(57) ABSTRACT

The principles described herein relate to the training and implementation of a model designed to estimate the probability of new security incidents being true incidents. This occurs in an environment where a service such as a SIEM monitors a network of computing systems and other resources and detects a variety of incidents that could be security threats. These incidents are reported to the SOC for investigation and the SOC will take appropriate action to mitigate potential threats of true security breaches. As part of the investigation process, the SOC can label whether a security incident is true, false or benign. After labeling enough security incidents a model can be produced to estimate the probability that new security incidents are true incidents. This would help the SOC filter through security incidents more efficiently and allow for quicker response of the most likely security breaches.

19 Claims, 8 Drawing Sheets

(56) References Cited

U.S. PATENT DOCUMENTS

| | | | | |
|---|---|---|---|---|
| 2021/0281592 A1* | 9/2021 | Givental | ............... | G06N 20/10 |
| 2021/0377303 A1* | 12/2021 | Bui | ..................... | G06F 40/14 |
| 2022/0012625 A1* | 1/2022 | Ben-Itzhak | ............ | G06N 20/00 |

OTHER PUBLICATIONS

"CISA National Cyber Incident Scoring System", Retrieved from: https://web.archive.org/web/20211231180710/https://www.cisa.gov/uscert/CISA-National-Cyber-Incident-Scoring-System, Dec. 31, 2021, 4 Pages.

"Open Neural Network Exchange", Retrieved from: https://onnx.ai/, Retrieved on: Feb. 2, 2023, 3 Pages.

Boucher, et al., "Security Incident", Retrieved from: https://learn.microsoft.com/en-us/azure/azure-monitor/reference/tables/securityincident, Feb. 1, 2023, 2 Pages.

Bressler, Noam, "How to Check the Accuracy of Your Machine Learning Model", Retrieved from: https://deepchecks.com/how-to-check-the-accuracy-of-your-machine-learning-model/, Nov. 23 2022, 9 Pages.

Brownlee, Jason, "How to Manually Optimize Neural Network Models", Retrieved from: https://machinelearningmastery.com/manually-optimize-neural-networks/, Dec. 4, 2020, 23 Pages.

Didugu, Chetana, "IT Incident Ticket Classification with ML, DL and Language Models", Retrieved from: https://medium.com/analytics-vidhya/it-incident-ticket-classification-with-ml-dl-and-language-models-2bfc593885, Nov. 10, 2020, 19 Pages.

Kandakumar, Karthik K., "IT Support Ticket Classification using Machine Learning and ServiceNow", Retrieved from: https://medium.com/@karthikkumar_57917/it-support-ticket-classification-using-machine-learning-and-ml-model-deployment-ba694c01e416, Mar. 16, 2019, 22 Pages.

Kharwal, Aman, "Classification Model Evaluation in Machine Learning", Retrieved from: https://thecleverprogrammer.com/2022/08/09/classification-model-evaluation-in-machine-learning/, Aug. 9, 2022, 8 Pages.

Saravanan, Jeeva, "How to Evaluate your Machine Learning Model", Retrieved from: https://medium.com/analytics-vidhya/how-to-evaluate-your-machine-learning-model-76a7671e9f2e, May 29, 2021, 27 Pages.

Vallim, et al., "ONNX Models", Retrieved from: https://learn.microsoft.com/en-us/windows/ai/windows-ml/get-onnx-model, Dec. 30, 2021, 2 Pages.

Wangen, Gaute B., "Quantifying and Analyzing Information Security Risk from Incident Data", In Proceedings of The Sixth International Workshop on Graphical Models for Security, Jul. 2019, 26 Pages.

* cited by examiner

LIKELIHOOD ASSESSMENT FOR SECURITY INCIDENT ALERTS

BACKGROUND

Network security is vital for keeping an organization running properly. Without such security, an organization's various computing systems and other network resources may be exposed to malicious programs. Such programs could access sensitive data, hold data and resources for ransom, or perform other damaging acts.

In order to maintain a secure network, an organization may establish a Security Operations Center (SOC). An SOC employs people, processes, and technology to continuously monitor and improve the organization's security while preventing, detecting, analyzing, and responding to cybersecurity incidents.

A common technology an SOC will employ is a SIEM tool (Security Information and Event Management). Such tools will provide security alerts generated by applications and network hardware that are deployed within the organization. The SOC will investigate the alerts and take appropriate action to mitigate potential threats.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the providing of a list of new security alerts that each include a likelihood of being a valid security incident. In accordance with the method, the system accesses a labelled set of previous security incident alerts generated within a network environment controlled by an organization. Each security incident alert of the labelled set are labelled by the organization with a validity assessment of the respective security incident alert. For example, the security incident alert may be labelled as a true positive, or a false positive. Then, the system trains an assessment model with the accessed labelled set to configure the assessment model to perform a likelihood validity assessment for future security incident alerts generated as a result of security incidents within the network environment. The likelihood validity assessment includes an estimate of a validity of the respective security incident and a likelihood level of the estimate.

During the inference phase, the system predicts a likelihood validity assessment for future security incident alerts that arise from within the network environment. For example, in response to detecting that a respective security incident alert was generated within the network environment, the system uses the trained assessment model to perform the likelihood validity assessment on the respective security incident alert. As an example, the system could indicate that there is a certain probability of the alert being of a true positive security incident alert that represents a true security issue. The system then causes the multiple likelihood validity assessments to be reported to the organization.

This allows the entities within the organization to be able to quickly narrow in on security incident alerts that are most likely to be reflective of actual security problems. Therefore, the organization can take proper steps to remedy the security problem. In one embodiment, the list is provided as a sorted list that is sorted by the likelihood of the security incident being a true positive. Alternatively, or in addition, the sorting could take into account a severity level. Thus, the most severe and the most likely true security alerts will be surfaced to the top of the organization's attention, allowing for rapid remediation of the most urgent security problems within the organization.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the providing of a list of new security alerts that each include a likelihood of being a valid security incident. In accordance with the method, the system accesses a labelled set of previous security incident alerts generated within a network environment controlled by an organization. Each security incident alert of the labelled set are labelled by the organization with a validity assessment of the respective security incident alert. For example, the security incident alert may be labelled as a true positive, or a false positive. Then, the system trains an assessment model with the accessed labelled set to configure the assessment model to perform a likelihood validity assessment for future security incident alerts generated as a result of security incidents within the network environment. The likelihood validity assessment includes an estimate of a validity of the respective security incident and a likelihood level of the estimate.

During the inference phase, the system predicts a likelihood validity assessment for future security incident alerts that arise from within the network environment. For example, in response to detecting that a respective security incident alert was generated within the network environment, the system uses the trained assessment model to perform the likelihood validity assessment on the respective security incident alert. As an example, the system could indicate that there is a certain probability of the alert being of a true positive security incident alert that represents a true security issue. The system then causes the multiple likelihood validity assessments to be reported to the organization.

This allows the entities within the organization to be able to quickly narrow in on security incident alerts that are most likely to be reflective of actual security problems. Therefore, the organization can take proper steps to remedy the security problem. In one embodiment, the list is provided as a sorted list that is sorted by the likelihood of the security incident being a true positive. Alternatively, or in addition, the sorting could take into account a severity level. Thus, the most severe and the most likely true security alerts will be surfaced to the top of the organization's attention, allowing for rapid remediation of the most urgent security problems within the organization.

Figure 1:
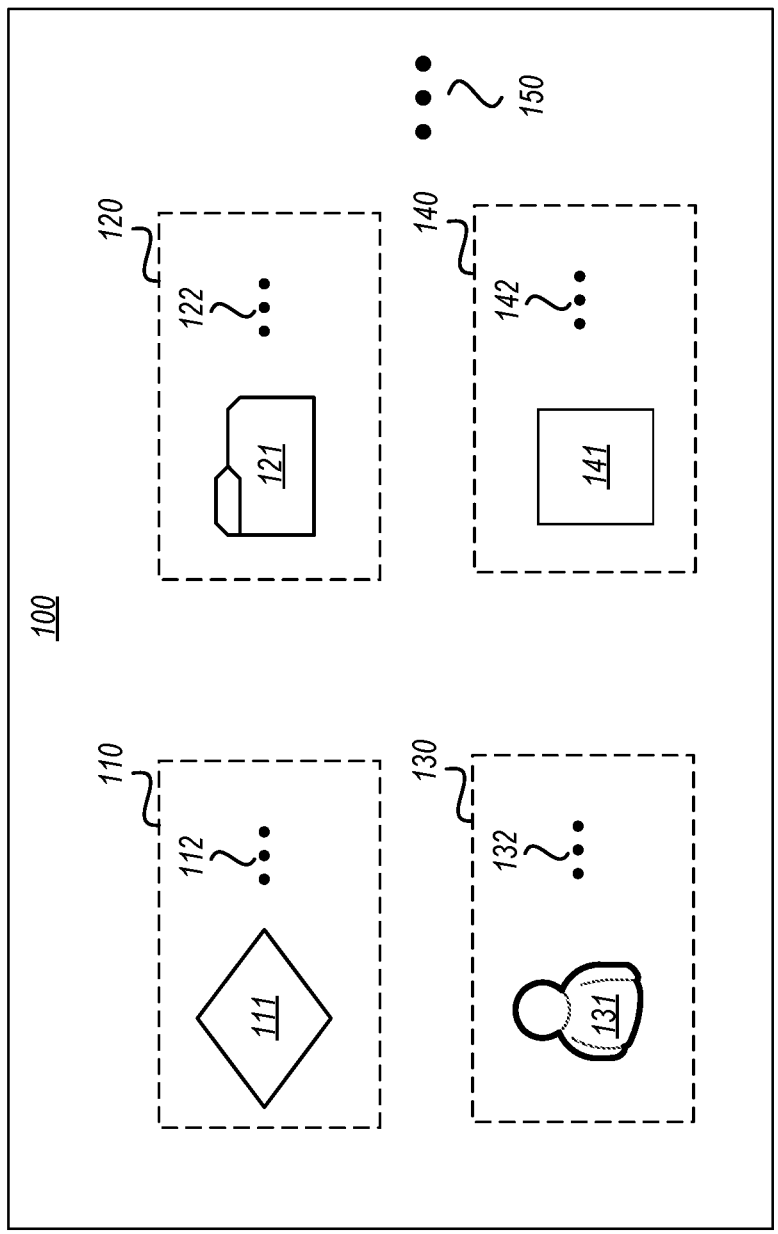
FIG. 1 illustrates a representation of an organization, which represents an example of an organization in which various security incidents might occur, and which includes a variety of different asset types.

FIG. 1 illustrates a representation of an organization 100, which represents an example of an organization in which various security incidents might occur, and which includes a variety of different asset types. Examples of organizations include any organization that has interconnected computing systems including, but not limited to, corporations, institutions, universities, businesses, departments, buildings, and so forth. However, the principles described herein are not limited to any particular type of organization.

When a security incident occurs, there may be one or more assets of potentially different types that are related to the security incident. As an example, a particular security incident might occur when a particular user operating on a particular machine attempts to access a particular file. Thus, that particular user, machine and file are related to the security incident.

The illustrated environment 100 includes four different types of assets including resources 110, files 120, users 130 and machines 140. However, the types and variety of assets may vary from organization to organization, as represented by the ellipsis 150. Even within a single organization, the types of resources may change over time, as also represented by the ellipsis 150. Accordingly, the enumeration of machines, files, resources, and users should be viewed as a mere example of the assets within an organization.

The resources 110 includes a resource 111 amongst potentially others as represented by the ellipsis 112. The files 120 includes a file 121 amongst potentially others as represented by the ellipsis 122. The users 130 includes a user 131 amongst potentially others as represented by the ellipsis 132. The machines 140 includes a machine 141 amongst potentially others as represented by the ellipsis 142. The ellipses 112, 122, 132 and 142 represent that the principles described herein are applicable regardless of how many assets of each type are present within an organization The ellipses 112, 122, 132 and 142 also represent that the number of each type of asset may even dynamically change over time. As an example, the users within an organization may change over time as new people join the organization.

An organization can be attacked through various types of network security breaches. Thus, organizations typically put in place various protective measures in order to guard against such network security incidents. Those protective measures begin by accurately detecting security incidents in the first place. Accordingly, in addition to assets, organizational networks also include various sensors that aim to detect behaviors or actions that are potentially indicative of a security threat.

Figure 2:
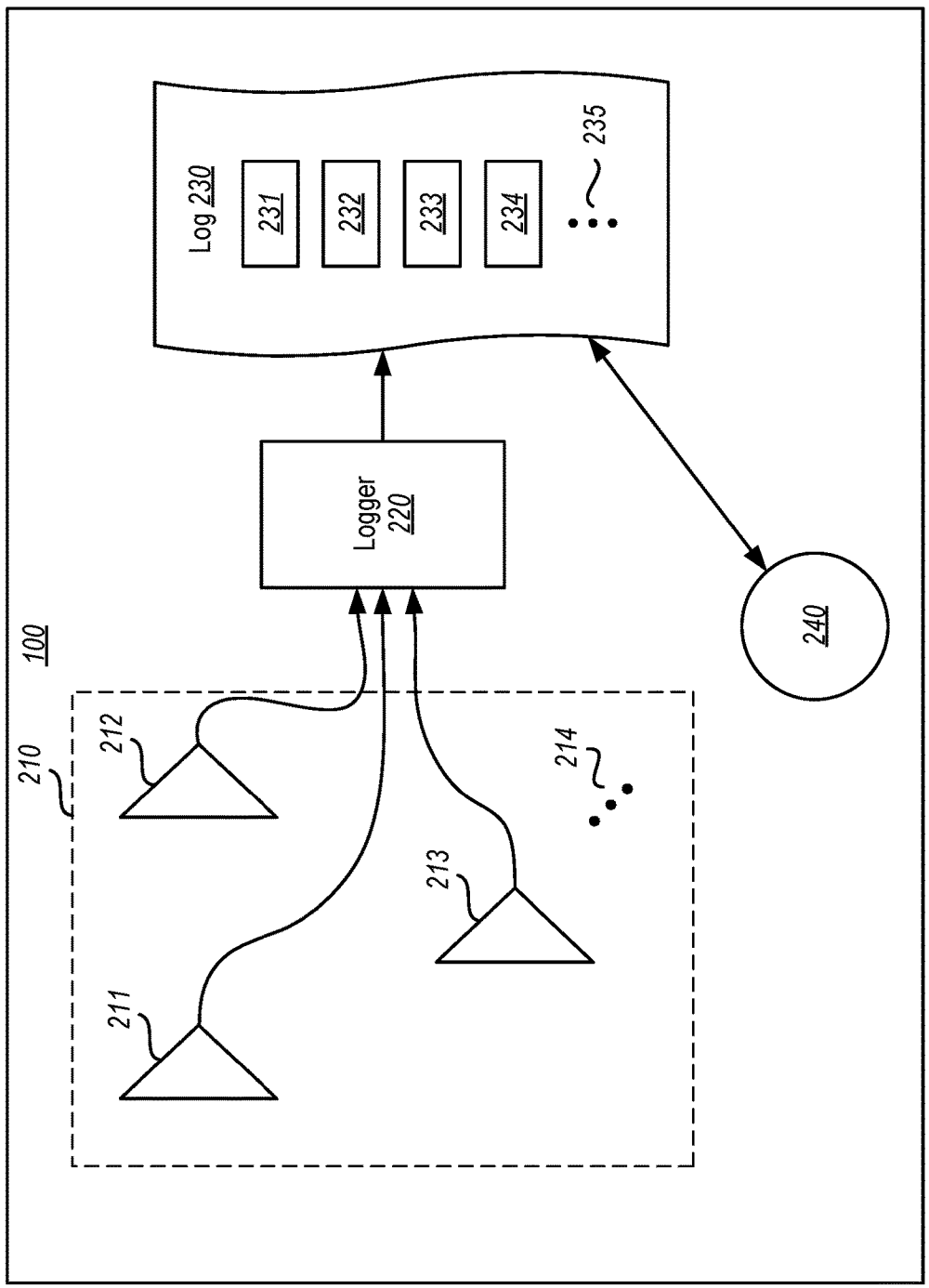
FIG. 2 illustrates a representation of the organization of FIG. 1 with protective measures in place.

FIG. 2 illustrates a representation of the organization 100 of FIG. 1 with protective measures in place. While the assets 110, 120 130, 140 and 150 are still present within the organization 100, these assets are not shown in FIG. 2 in order to allow the focus of FIG. 2 to be on the protective measures of the organization 100.

In particular, in FIG. 2, the organization 100 is illustrated as including sensors 210 that detect security incidents, a logger 220 that reports respective security incident alerts to a log 230, and a security operations center 240. The sensors 210 are illustrated as including three sensors 211, 212 and 213. However, the ellipsis 214 represents that the organization can include any number of sensors that can detect potential security incidents. The sensors 210 may be distributed throughout the organization in order to detect security incidents by locale. Alternatively, or in addition, the sensors 210 may specialize in detecting particular types of security incidents.

The potential security incidents detected by the sensors 211, 212 and 213 are reported into the log 230 via, for example, a logger component 220. The log 230 is illustrated as including four security incident alerts 231 through 234. However, the ellipsis 235 represents that there may be any number of security incident alerts within the log 230. Over time, new security incident alerts will be added to the log 230 and potentially stale security incident alerts may be deleted from the log 230.

The security operations center 240 monitors the log 230 by reading security incident alerts and making those alerts visible to artificial or human intelligence. The artificial or human intelligence can then evaluate whether the security incident alert reflects a real security incident, whether that security incident is significant, and what remedy (if any) should be taken in order to neutralize or ameliorate the effect of this or similar security incidents. In an example, one or more Information Technology (IT) representatives of the organization could staff the security operations center 240.

Artificial or human intelligence can also label the security incident alert with additional data, such as whether the security incident alert was a false positive in that there is no underlying security incident, or a true positive in that there was an underlying security incident. Alternatively, the artificial or human intelligence could label the security incident alert as a benign positive in that the security incident alert was caused by controlled testing of the protective measures of the organization's network.

The logger 220, the log 230, and the security operations center 240 are illustrated as being within the organization 100. However, the logger 220 and the log 230 may alternatively be implemented external to the organization via perhaps a cloud service. Furthermore, while the security operations center 240 may be implemented internal to the organization, all or some of the functionality of the security operations center 240 may be implemented within a cloud computing environment.

Figure 3:
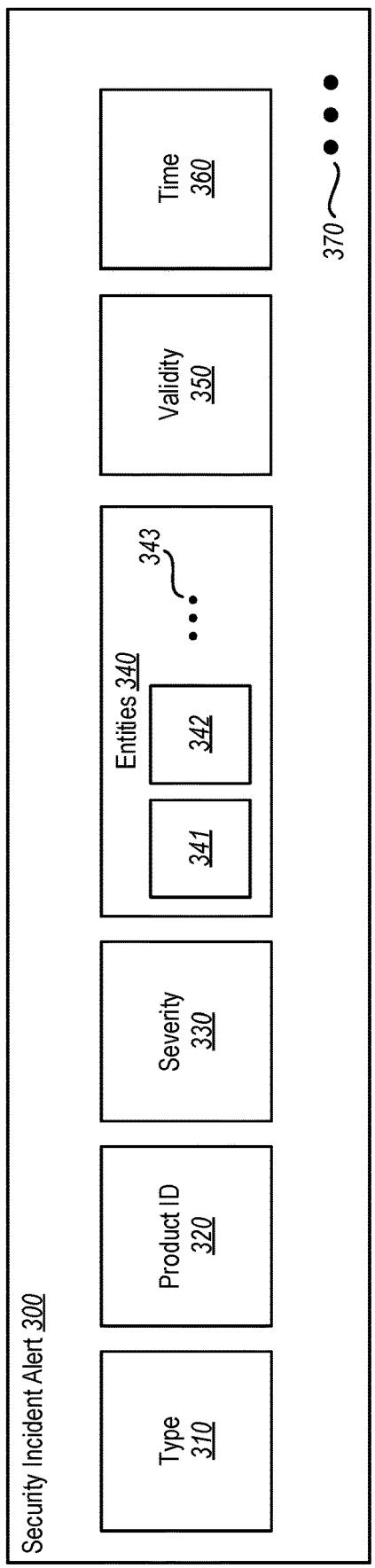
FIG. 3 schematically illustrates a security incident alert data structure.

FIG. 3 schematically illustrates a security incident alert data structure 300. The security incident alert data structure 300 is an example of how each of the security incident alerts 231 through 234 of the log 230 in FIG. 2 may be structured. The security incident alert data structure 300 includes various fields that represent features of the security incident alert 300. For instance, the security incident alert data structure 300 includes an incident type 310, a product identifier 320, a severity level 330, related entities 340, an alert validity 350, a time 360, amongst potentially other features as represented by the ellipsis 370.

The alert type 310 represents an incident type. As an example only, the alert type 310 might be unusual behavior from privileged user accounts, unauthorized insiders trying to access servers and data, anomalous outbound network traffic, traffic sent to or from unknown locations, excessive consumption of resources, unapproved changes in configuration, hidden files, abnormal browsing activity, suspicious registry entries and so forth. The product identifier 320 identifies the product that generated the alert. The severity level 330 indicates an estimated severity of the security incident (e.g., severe, moderate, minor).

The related entities 340 includes any organizational assets that relate to the security incident. For example, the assets 110, 120, 130 and 140 of FIG. 1 could be related to the security incident. As an example, if the security incident occurred due to user 131 using machine 141 to access resource 111, then that user, machine and resource may be identified as related entities of the security incident. In FIG. 3, the entities field 340 includes entity field 341 and entity field 342. However, the ellipsis 343 represents that there may be any number of entities identified as being related to the security incident.

The validity field 350 identifies an estimated validity of the security incident alert. As an example, the validity could be expressed as a "true positive" if the underlying security incident is estimated to be real, a "false positive" if the alert is estimated to not really reflect an actual security incident, or perhaps "benign positive" if the alert is based on a real security incident that occurred as a result of controlled testing of the protective measures within the organization. As an example, skilled agents of the organization could use the security operations center 240 to attach validity labels to the security incidents.

In accordance with the principles described herein, security incident alerts in which agents of the organization have labelled the validity of the alert will be used as training data to train models that aim to automatically estimate validity data for future security incident alerts. Thus, the validity field 350 could also represent a validity estimation made by such a trained model. The validity data could also include a likelihood indicator that can be expressed qualitatively (e.g., "highly likely", "moderately likely", and so forth) or quantitatively by percentage for example. As an example, a particular security incident alert might be given a 90 percent chance of being a true positive.

Finishing the example of FIG. 3, the security incident alert data structure 300 also includes a time 360 at which the security incident took place, the time that the security incident alert was created and/or the time that the security incident alert was recorded in the log. The ellipsis 370 represents that the security incident alert data structure could include any number, type, and variety of fields representing features of the security incident alert.

Figure 4:
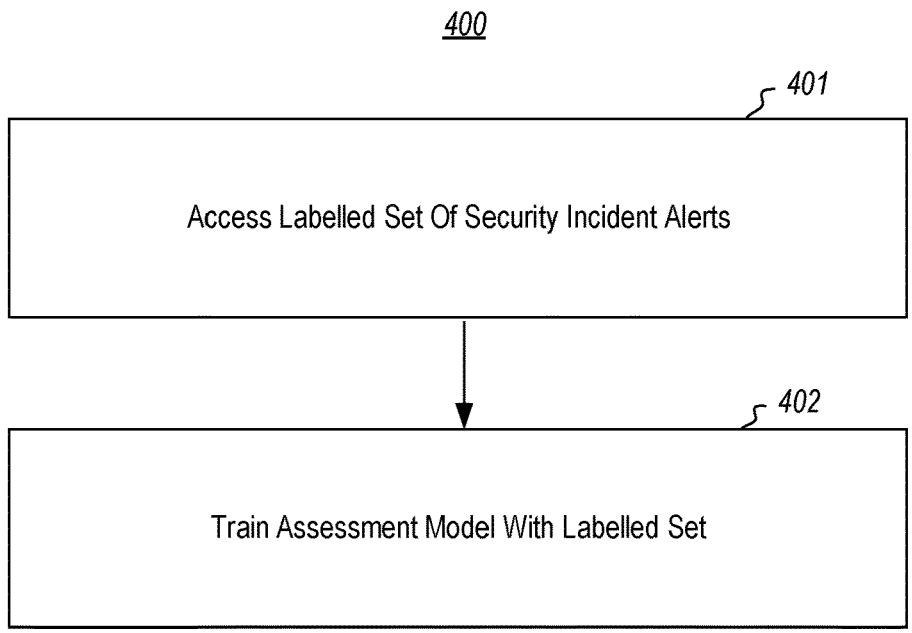
FIG. 4 illustrates a flowchart of a method for training a machine-learned model to provide likelihood validity assessments for new security incident alerts generated within an organization.
Figure 5:
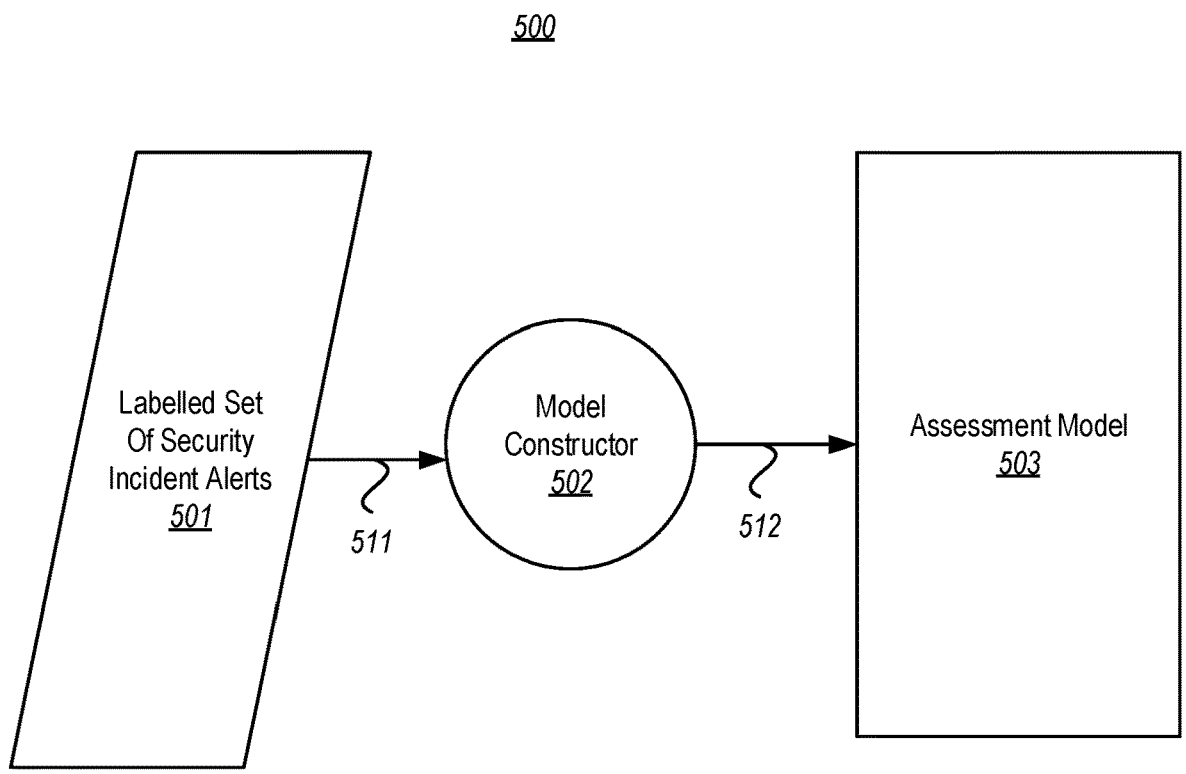
FIG. 5 illustrates an environment in which the assessment model is trained.
Figure 6:
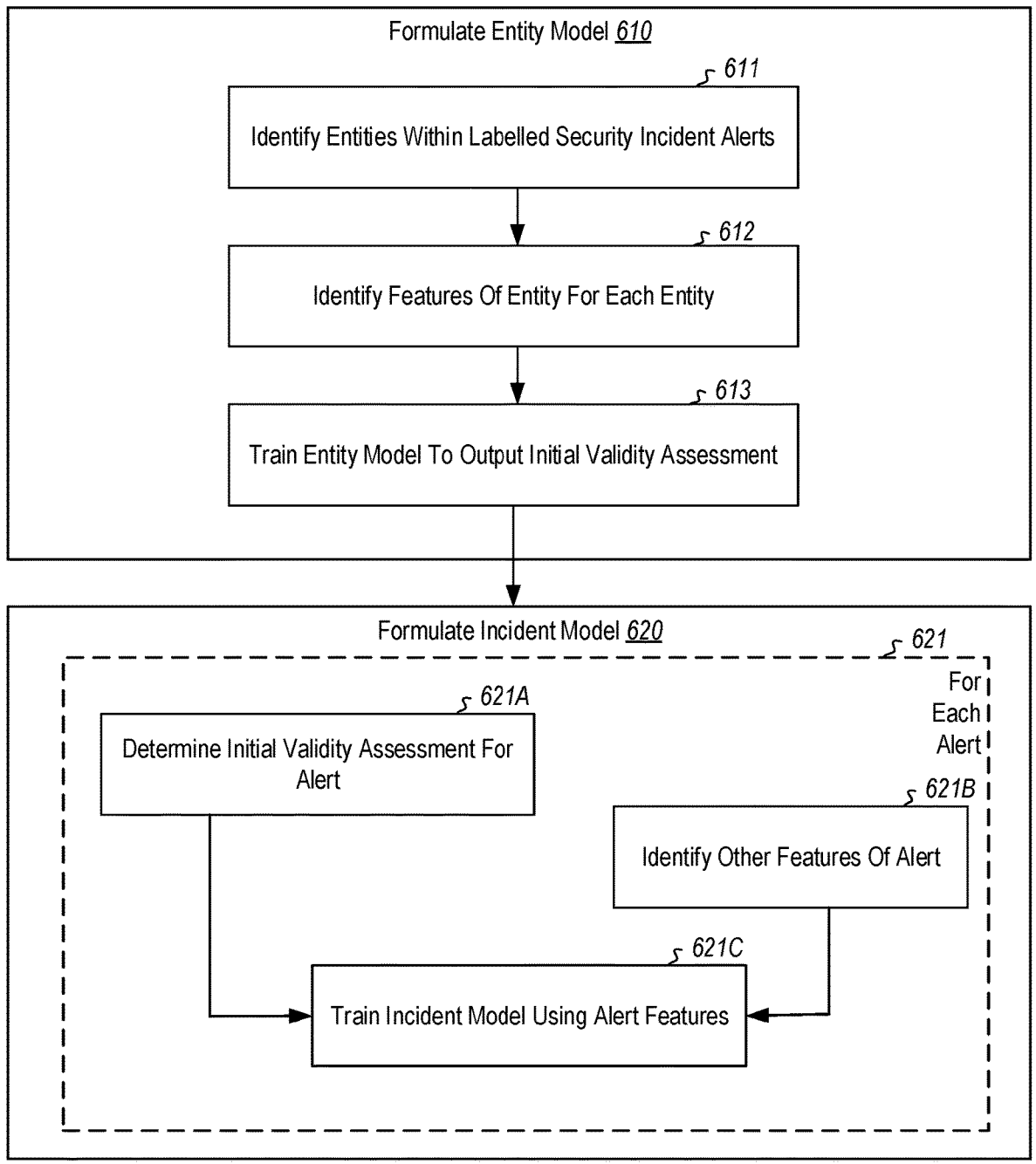
FIG. 6 illustrates a method for training an assessment model, and represents an example of the act of training the assessment model of FIG. 4.
Figure 7:
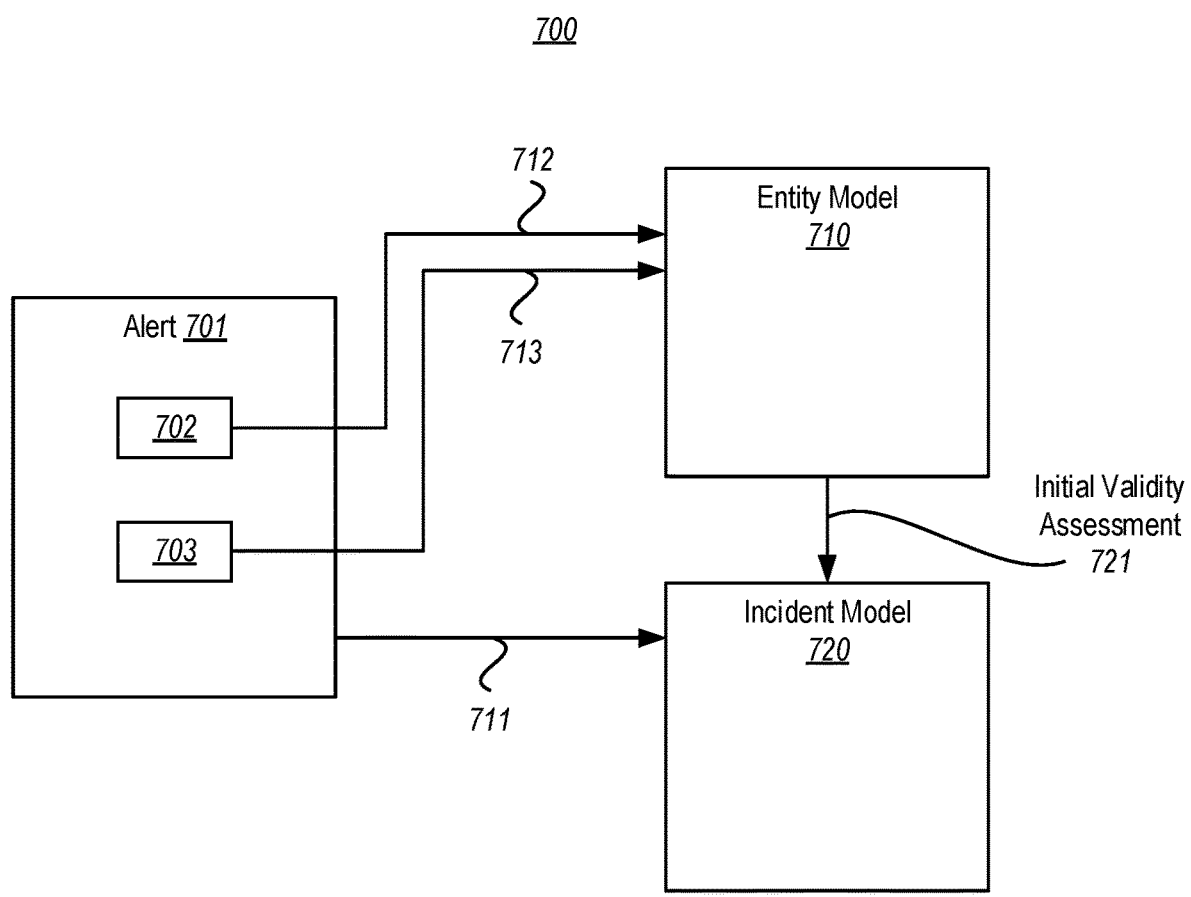
FIG. 7 illustrates a two-stage assessment model that includes an entity model and an incident model.

FIG. 4 illustrates a flowchart of a method 400 for training a machine-learned model to provide likelihood validity assessments for new security incident alerts generated within an organization. FIGS. 5 through 7 each relate to this training phase. After the discussion of the training phase with respect to FIGS. 4 through 7, an inference phrase will be described with respect to FIGS. 7 and 8 in which the trained assessment model is put to use on live data in the form of subsequently generated security incident alerts to generate likelihood validity assessments for those subsequent alerts.

Referring to FIG. 4, the training phase involves first accessing a labelled set of previous security incident alerts generated within a network environment controlled by an organization (act 401). For example, referring to FIGS. 1 and 2, the organization could be the organization 100, and the network controlled by that organization 100 could be the network that includes the assets 110, 120, 130, 140 and 150 of FIG. 1, and that includes the protective measures of FIG. 2. In this case, the labelled set of previous security incident alerts could be acquired from the log 230. That is, each of the security incident alerts in the labelled set is labelled by the organization 100 (via the security operations center 240) with a validity assessment. In the example of FIG. 3, each of the security incident alert data structures 300 for each of the labelled set of security incident alerts includes a populated validity field 350.

Referring to FIG. 4, the assessment model is then trained with the labelled set of previous security incident alerts (act 402). FIG. 5 illustrates an environment 500 in which the assessment model is trained. In FIG. 5, the labelled set 501 of previous security incident alerts 501 is provided (as represented by arrow 511) to a model constructor component 502. The model constructor component 502 may be structured as described below for the executable component 906 of FIG. 9. The model constructor component 502 builds (as represented by arrow 512) the assessment model 503 such that the assessment model 503 is configured to perform a likelihood validity assessment for future security incident alerts generated as a result of security incidents within the network environment of the organization. This likelihood validity assessment means that the assessment model 503 will, in the inference phase, populate the validity field (e.g., validity field 350) of the respective future security incident alert data structure 300.

FIG. 6 illustrates a method 600 for training an assessment model, and represents an example of the act 402 of training the assessment model of FIG. 4. In accordance with the principles described herein, the trained assessment model itself includes two stages of models—an entity model and an incident model. For example, FIG. 7 illustrates a two-stage assessment model 700 that includes an entity model 710 and an incident model 720. The trained assessment model 700 is an example of the assessment model 503 of FIG. 5. The method 600 for training the two-staged assessment model will now be described with respect to the two-staged assessment model 700 of FIG. 7.

The method 600 for training the two-staged assessment model includes formulating an entity model (act 610). An example of this entity model is the entity model 710 of the assessment model 700 of FIG. 7. The model constructor identifies entities within the labelled set of security incident alerts (act 611). For example, the model constructor could read the entities field 340 of each of the security incident alerts in order to gather a list of entities for each of multiple (and potentially all) of the labelled security incident alert in the labelled set of security incident alerts. As an example, for each of the labelled set of security incident alerts, the model constructor could determine which resources, files, users, accounts, and machines are related to the respective labelled security incident alert. As an example, in FIG. 7, the security incident alert 701 includes entities 702 and 703.

Then, for each of one or more of the entities, the model constructor identifies one or more features of the identified one or more entities (act 612). A feature of an entity could be, for example, a proportion of security incident alerts that have the identified entity having a particular validity assessment. As an example, there could be a particular user related to a security incident alert that repeatedly performs activities that result in a false positive security incident alert. Thus, the percentage false positive for that user could be a feature of that user entity. As another example, there could be a particular machine related to a security incident alert that is particularly subject to cyberattacks (e.g., a firewall machine) and thus the percentage of true positives for alerts related to that machine is high. Thus, the percentage true positive for that machine could be a feature for that machine entity. Another example of a feature is the number of times an entity appears (in a particular time window) as a related entity within security incident alerts.

These identified features of the entities are used to train the entity model (act 613). The entity model could be as complex as a deep neural network. However, because the number of features here may be relatively small, the entity model may instead be a gradient boosted tree that receives the entity features and outputs an initial assessment of validity.

The incident model may also be formed (act 620) by the model constructor. As an example, the incident model could be the incident model 720 of FIG. 7. The incident model may be a neural network. However, because the number of features of a security incident alert may be quite small, the incident model may instead be a gradient boosted tree.

For each of multiple of the labelled set of previous security incident alerts, the model constructor performs the content of box 621. That is, the model constructor uses the initial validity assessment for one or more of the entities of security incident alert as an actual feature in the incident model (act 621A). As an example, the incident might have a feature that is the highest initial assessment of validity generated by the entity model for all of the related entities of the incident alert.

The constructor also identifies one or more other features of the security incident alert (act 621B). Examples of such other features include a severity of the security incident alert, a source type of the security incident alert, a source of the security incident alert, and so forth.

The constructor then trains the incident model using the identified one or more features of the respective security incident alert and including the initial assessment of validity as one or more additional features (act 621C). The trained incident model then is configured to output a final likelihood validity assessment associated with future security incident alerts.

By separating the model into two phases (an entity model phase and an incident model phase), accuracy of the likelihood validity assessment is improved. By training on a significant number of labelled security incident alerts, the assessment model becomes highly capable of predicting a likelihood that a future security incident alert is a true positive. Furthermore, the model is capable of generating the likelihood validity assessment substantially immediately when the security incident alert is generated in the first place. Thus, urgent and likely true positive security incident alerts can be quickly surfaced to the attention of the security operations center.

Figure 8:
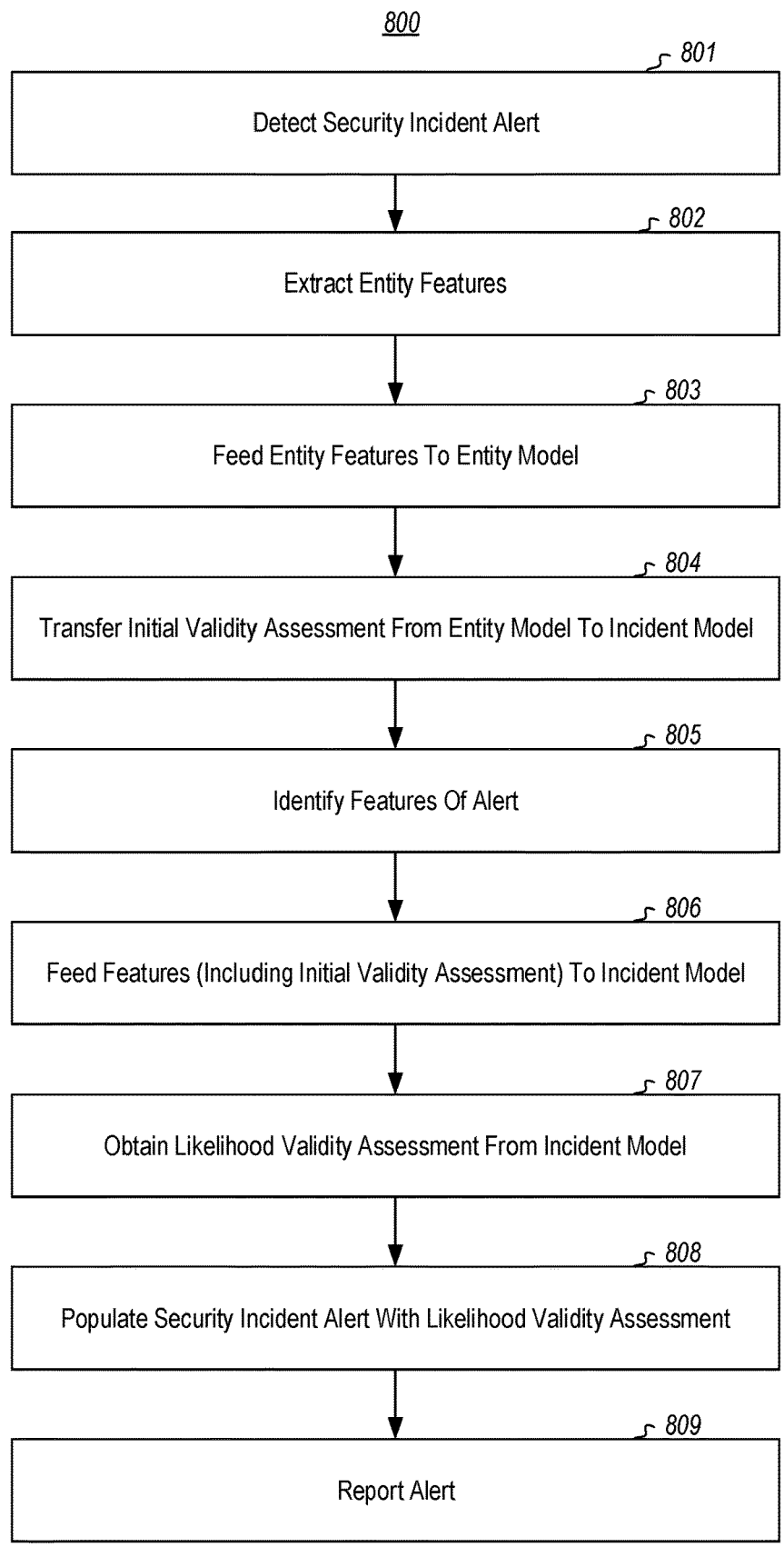
FIG. 8 illustrates a flowchart of a method for inferring a likelihood validity assessment for subsequent security incident alerts using the trained assessment model.

FIG. 8 illustrates a flowchart of a method 800 for inferring a likelihood validity assessment for subsequent (after training) security incident alerts using the trained assessment model. The method 800 begins upon detecting a security incident alert that was generated within the network of the organization (act 801), whereupon the trained assessment model is used to perform the likelihood validity assessment on the security incident alert.

To do this, the related entity features of the security incident alert are extracted (act 802). That is, the constituent related entities are read from the alert, and the features of those entities are identified. The features of the entities are then fed to the entity model (act 803). As an example, the features of entity 702 of the alert 701 may be fed (as represented by arrow 712) to the entity model 710 resulting in one initial validity assessment 721. Likewise, the features of the entity 703 of the alert 701 may be fed (as represented by arrow 713) to the entity model 710 resulting in another initial validity assessment 721.

Referring to FIG. 8, the initial likelihood validity assessments are then provided to the incident model (act 804). As an example, perhaps only the highest likelihood validity assessment is provided to the incident model to be used as a feature of the security incident alert. In addition, one or more other features of the security incident alert itself are identified (act 805). The features of the security incident alert are then fed (as represented by arrows 711 and 721 in FIG. 7) to the incident model (act 806). The incident model then generates a likelihood validity assessment (act 807), which can then be populated into the security incident alert data structure in the validity field (act 808).

This process may be repeated as each future security incident is received. The alert is reported to the organization (act 809) perhaps as often as each time a security incident alert is assessed. In addition, the list of security incident alerts can be re-sorted each time a new security incident alert is assessed. As an example, the incident alert can be sorted by likelihood of being a true positive alone. Alternatively, or in addition, the list could be sorted by a weighted combination of the likelihood of the alert being a true positive along with the severity of the alert. And this sorting can be updated frequently with the assessment of each new security incident alerts. Thus, urgent security incident alerts may be quickly inserted into the top of the list for the organization to address, without having to wait for a skilled user to make a manual assessment of the urgency of each security incident alert. Thus, urgent security incidents are likely to be addressed much faster.

Because the principles described herein are performed in the context of a computing system, some introductory discussion of a computing system will be described with respect to FIG. 9. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 9:
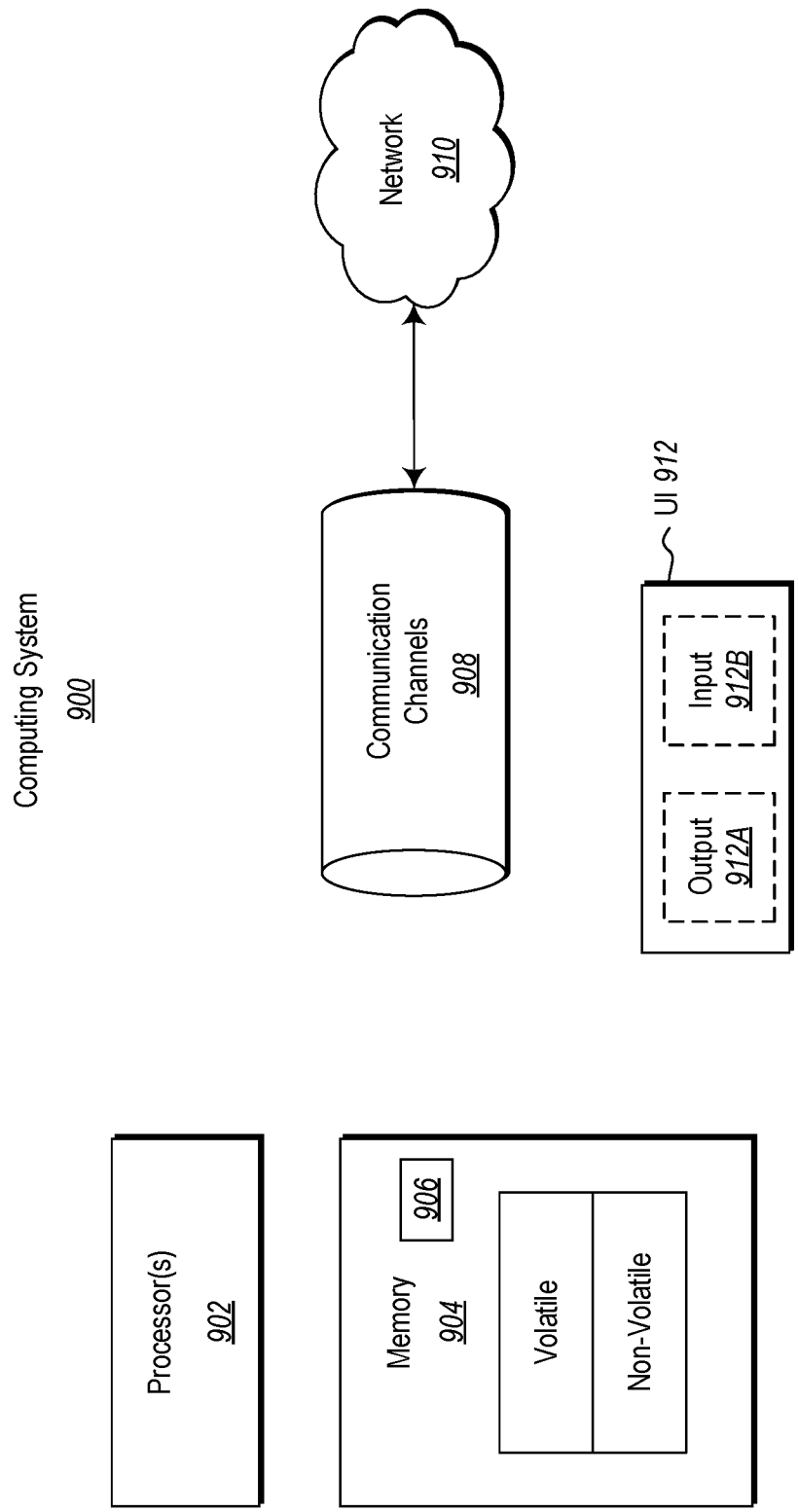
FIG. 9 illustrates an example computing system in which the principles described herein may be employed.

As illustrated in FIG. 9, in its most basic configuration, a computing system 900 includes at least one hardware processing unit 902 and memory 904. The processing unit 902 includes a general-purpose processor. Although not required, the processing unit 902 may also include a field programmable gate array (FPGA), an application specific integrated circuit (ASIC), or any other specialized circuit. In one embodiment, the memory 904 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 900 also has thereon multiple structures often referred to as an "executable component". For instance, the memory 904 of the computing system 900 is illustrated as including executable component 906. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 904 of the computing system 900. Computing system 900 may also contain communication channels 908 that allow the computing system 900 to communicate with other computing systems over, for example, network 910.

While not all computing systems require a user interface, in some embodiments, the computing system 900 includes a user interface system 912 for use in interfacing with a user. The user interface system 912 may include output mechanisms 912A as well as input mechanisms 912B. The principles described herein are not limited to the precise output mechanisms 912A or input mechanisms 912B as such will depend on the nature of the device. However, output mechanisms 912A might include, for instance, speakers, displays, tactile output, virtual or augmented reality, holograms and so forth. Examples of input mechanisms 912B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A method for providing a list of new security alerts that each include a likelihood of being a valid security incident, the method comprising:
    access a labelled set of previous security incident alerts generated within a network environment controlled by an organization, each security incident alert of the labelled set of previous security incident alerts being labelled by the organization with a validity assessment of the respective security incident alert;
    training an assessment model with the accessed labelled set to configure the assessment model to perform a "likelihood validity assessment" for future security incident alerts generated as a result of security incidents within the network environment,
    the likelihood validity assessment comprising an estimate of a validity of a respective security incident whether the security incident is a true positive or false positive and a likelihood level of the estimate;
    for each of a plurality of security incident alerts arising from within the network environment after the training:
    detecting a respective security incident alert that was generated within the network environment; and
    in response to the detection, using the trained assessment model to perform the likelihood validity assessment on the respective security incident alert, the likelihood validity assessment include an estimate of a validity of the respective security incident and a likelihood level of the estimate;
    sorting the plurality of security incident alerts based on a weighted combination of the plurality of likelihood validity assessments and incident severity; and
    causing the sorted plurality of likelihood validity assessments to be reported to the organization.

2. The method in accordance with claim 1, the training of the assessment model comprising:
    formulating an entity model by, for each of multiple of the labelled set of previous security incident alerts, identifying one or more entities within the respective labelled security incident alert, identifying one or more features of the identified one or more entities, and training the entity model using the one or more features, such that the entity model is formulated by training on one or more features of one or more entities of multiple of the labelled security incident alerts, the trained entity model configured to output an initial assessment of validity.

3. The method in accordance with claim 2, the identifying of the one or more features of the identified one or more entities comprising:
identifying at least one of the features of the entity as being based on the labeled validity assessment of respective security incident alerts that contain the entity.

4. The method in accordance with claim 3, the training of the assessment model further comprising:
formulating an incident model by, for each of multiple of the labelled set of previous security incident alerts, identifying one or more features of the respective security incident alert, and training the incident model using the identified one or more features of the respective security incident alert and including the initial assessment of validity as one or more additional features, such that the incident model is formulated by training on the one or more features of each of the multiple respective security incident alerts as well as on the initial assessment of validity.

5. A method in accordance with claim 4, the identified feature for at least one of the identified one or more entities being a proportion of security incident alerts that have the identified entity having a particular validity assessment.

6. A method in accordance with claim 4, at least one of the identified one or more entities being a user associated with the respective labelled security incident alert.

7. A method in accordance with claim 4, at least one of the identified one or more entities being a machine associated with the respective labelled security incident alert.

8. A method in accordance with claim 4, at least one of the identified one or more entities being a uniform resource identifier associated with the respective labelled security incident alert.

9. A method in accordance with claim 4, at least one identified one or more entities being a file associated with the respective labelled security incident alert.

10. A method in accordance with claim 4, at least one identified one or more entities being an account associated with the respective labelled security incident alert.

11. A method in accordance with claim 4, the identified feature for at least one of the identified one or more security incident alerts being a type of the security incident alert.

12. A method in accordance with claim 4, the identified feature for at least one of the identified one or more security incident alerts being a severity of the security incident alert.

13. A method in accordance with claim 4, the identified feature for at least one of the identified one or more security incident alerts being a source type of the security incident alert.

14. A method in accordance with claim 4, the identified feature for at least one of the identified one or more security incident alerts being a source of the security incident alert.

15. A method in accordance with claim 1, the respective security incident alert that was generated within the network environment after training being a first post-training security incident alert, the plurality of security incident alerts that arise after the further comprising a second post-training security alert, the method comprising:
detecting the second post-training security incident alert that was generated within the network environment; and in response to the detection of the second post-training security incident alert, using the trained assessment model to perform the likelihood validity assessment on the second post-training security incident alert.

16. The method in accordance with claim 5, the causing of the plurality of likelihood validity assessments to be reported to the organization comprising:
causing the likelihood validity assessment for the first post-training security alert to be reported to the organization; and
causing the likelihood validity assessment for the second post-training security alert to be reported to the organization, the causing of the likelihood validity assessment for the first post-training security alert to be reported occurring prior to detecting the second post-training security incident alert that was generated within the network environment.

17. A computing system comprising: one or more processors; and one or more hardware storage device having thereon computer-executable instructions that are structured such that, if executed by the one or more processors, would cause the computing system to perform the following: access a labelled set of previous security incident alerts generated within a network environment controlled by an organization, each security incident alert of the labelled set of previous security incident alerts being labelled by the organization with a validity assessment of the respective security incident alert; training an assessment model with the accessed labelled set to configure the assessment model to perform a "likelihood validity assessment" for future security incident alerts generated as a result of security incidents within the network environment, wherein performing a likelihood validity assessment comprises (i) generating an initial validity assessment at least based on one or more features of entities that are related to a particular security incident alert and (ii) generating a final validity assessment based on at least the initial validity assessment and one or more features of the security incident alert, and wherein the final validity assessment comprises an estimate of a validity of a respective security incident whether the security incident is a true positive or false positive and a likelihood level of the estimate; for each of a plurality of security incident alerts arising from within the network environment after the training detecting a respective security incident alert that was generated within the network environment; and in response to the detection, using the trained assessment model to perform the likelihood validity assessment on the respective security incident alert, by generating an initial validity assessment and a final validity assessment for the respective security incident alert, the final validity assessment including an estimate of a validity of the respective security incident and a likelihood level of the estimate; sorting the plurality of security incident alerts based on a weighted combination of the plurality of likelihood validity assessments and incident severity; and causing the sorted plurality of likelihood validity assessments to be reported to the organization.

18. A hardware storage device comprising having thereon computer-executable instructions that are structured such that, if executed by one or more processors a computing system, would cause the computing system to perform the following: access a labelled set of previous security incident alerts generated within a network environment controlled by an organization, each security incident alert of the labelled set of previous security incident alerts being labelled by the organization with a validity assessment of the respective security incident alert; accessing an assessment model comprising an entity model and an incident model; training the entity model on at least an entity feature based on the labelled validity assessment of respective security incident alerts that contain an entity related to one or more security incident alerts in order to configure the entity model to generate an initial validity assessment as part of a likelihood validity assessment being performed by the assessment model; for each of a plurality of security incident alerts arising from within the network environment after the training: detecting a respective security incident alert that was generated within the network environment; and in response to the detection, using the trained assessment model to perform the likelihood validity assessment on the respective security incident alert, the likelihood validity assessment including an estimate of a validity of the respective security incident whether the security incident is a true positive or false positive and a likelihood level of the estimate; sorting the plurality of security incident alerts based on a weighted combination of the plurality of likelihood validity assessments and incident severity; and causing the sorted plurality of likelihood validity assessments to be reported to the organization.

19. The hardware storage device of claim 18, the computing system being further caused to perform the following:
 training the incident model on one or more features of the respective security incident alerts and the initial validity assessment.

\* \* \* \* \*